(12) United States Patent
Seymour et al.

(10) Patent No.: US 11,028,721 B2
(45) Date of Patent: Jun. 8, 2021

(54) COATING TO IMPROVE OXIDATION AND CORROSION RESISTANCE OF ABRASIVE TIP SYSTEM

(71) Applicant: United Technologies Corporation, Farmington, CT (US)

(72) Inventors: Kevin Seymour, Marlborough, CT (US); Christopher W. Strock, Kennebunk, ME (US); Thomas D. Kasprow, Glastonbury, CT (US)

(73) Assignee: Ratheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/039,907

(22) Filed: Jul. 19, 2018

(65) Prior Publication Data
US 2020/0025016 A1    Jan. 23, 2020

(51) Int. Cl.
| | |
|---|---|
| *F01D 11/12* | (2006.01) |
| *B32B 7/05* | (2019.01) |
| *B32B 5/16* | (2006.01) |
| *B32B 7/12* | (2006.01) |
| *F01D 5/14* | (2006.01) |
| *F01D 5/28* | (2006.01) |

(52) U.S. Cl.
CPC ............. *F01D 11/122* (2013.01); *B32B 5/16* (2013.01); *B32B 7/05* (2019.01); *B32B 7/12* (2013.01); *F01D 5/147* (2013.01); *F01D 5/288* (2013.01); *B32B 2603/00* (2013.01); *F05D 2230/90* (2013.01)

(58) Field of Classification Search
CPC ........ F01D 5/288; F01D 11/12; F01D 11/122; F01D 5/20; F01D 11/125; F05D 2300/611
See application file for complete search history.

(56) References Cited

U.S. PATENT DOCUMENTS

| | | |
|---|---|---|
| 4,610,698 A | 9/1986 | Eaton et al. |
| 4,680,199 A | 7/1987 | Vontell et al. |
| 4,689,242 A | 8/1987 | Pike |
| (Continued) | | |

FOREIGN PATENT DOCUMENTS

| | | |
|---|---|---|
| DE | 102006016995 A1 | 10/2007 |
| EP | 0573928 A1 | 12/1993 |
| (Continued) | | |

OTHER PUBLICATIONS

European Search Report dated Dec. 18, 2019 for corresponding European Patent Application 19187387.6.

(Continued)

*Primary Examiner* — Courtney D Heinle
*Assistant Examiner* — Andrew Thanh Bui
(74) *Attorney, Agent, or Firm* — Bachman & LaPointe, P.C.

(57) ABSTRACT

An abrasive coating for a substrate of a component in a gas path exposed to a maximum temperature of 500 degree Fahrenheit, comprising: a plurality of grit particles adapted to be placed on a top surface of the substrate; a matrix material bonded to the top surface; the matrix material partially surrounds the grit particles, wherein the grit particles extend above the matrix material relative to the top surface; and a film of oxidant resistant coating applied over the plurality of grit particles and the matrix material.

16 Claims, 2 Drawing Sheets

(56) References Cited

U.S. PATENT DOCUMENTS

| | | | |
|---|---|---|---|
| 4,741,973 A | 5/1988 | Condit et al. | |
| 4,744,725 A | 5/1988 | Matarese et al. | |
| 5,059,095 A | 10/1991 | Kushner et al. | |
| 5,453,329 A | 9/1995 | Everett et al. | |
| 5,932,356 A | 8/1999 | Sileo et al. | |
| 5,935,407 A * | 8/1999 | Nenov | C23C 28/00 205/183 |
| 5,952,110 A | 9/1999 | Schell et al. | |
| 6,057,047 A | 5/2000 | Maloney | |
| 6,190,124 B1 | 2/2001 | Freling et al. | |
| 6,194,086 B1 | 2/2001 | Nenov et al. | |
| 6,468,040 B1 | 10/2002 | Grylls et al. | |
| 6,532,657 B1 * | 3/2003 | Weimer | C23C 8/02 29/889.2 |
| 6,833,203 B2 | 12/2004 | Bose et al. | |
| 7,510,370 B2 | 3/2009 | Strangman et al. | |
| 7,718,280 B2 | 5/2010 | Wilson | |
| 9,598,973 B2 * | 3/2017 | Ghasripoor | F01D 5/288 |
| 9,713,912 B2 | 7/2017 | Lee | |
| 9,957,826 B2 | 5/2018 | Novikov et al. | |
| 10,259,720 B2 | 4/2019 | Balbach et al. | |
| 10,731,260 B2 * | 8/2020 | Seymour | F01D 5/288 |
| 2003/0008764 A1 | 1/2003 | Wang et al. | |
| 2004/0023020 A1 | 2/2004 | Bose et al. | |
| 2004/0208749 A1 | 10/2004 | Torigoe et al. | |
| 2005/0035086 A1 * | 2/2005 | Chen | C23C 4/00 216/83 |
| 2007/0099011 A1 | 5/2007 | Wilson | |
| 2008/0166225 A1 | 7/2008 | Strangman et al. | |
| 2009/0311552 A1 | 12/2009 | Manier et al. | |
| 2012/0099972 A1 | 4/2012 | Guo et al. | |
| 2013/0149163 A1 * | 6/2013 | Parkos, Jr. | F01D 5/20 416/224 |
| 2013/0154194 A1 | 6/2013 | Van Saun | |
| 2015/0118060 A1 | 4/2015 | Kumar et al. | |
| 2015/0354397 A1 | 12/2015 | Novikov et al. | |
| 2016/0069184 A1 * | 3/2016 | Ribic | B23K 15/0053 416/95 |
| 2016/0069195 A1 | 3/2016 | Hewitt et al. | |
| 2016/0160661 A1 | 6/2016 | Balbach et al. | |
| 2016/0199930 A1 | 7/2016 | Yarbrough | |
| 2016/0341051 A1 * | 11/2016 | Hewitt | F01D 5/20 |
| 2018/0347390 A1 * | 12/2018 | Wilson | F01D 11/122 |
| 2020/0024971 A1 | 1/2020 | Seymour et al. | |
| 2020/0025016 A1 | 1/2020 | Seymour et al. | |

FOREIGN PATENT DOCUMENTS

| | | |
|---|---|---|
| EP | 1408197 A1 | 4/2004 |
| EP | 3056679 A1 | 8/2016 |
| EP | 3088559 A1 | 11/2016 |
| EP | 3239465 A1 | 11/2017 |
| GB | 2529854 A | 3/2016 |
| WO | 2007115551 A1 | 10/2007 |

OTHER PUBLICATIONS

Non-Final Office Action dated Mar. 12, 2020 issued for corresponding U.S. Appl. No. 16/039,909.
European Search Report dated Apr. 1, 2020 for corresponding European Patent Application 19185773.9.
European Search Report dated Mar. 31, 2020 for corresponding European Patent Application 19185794.5.
Non-Final Office Action dated Jul. 6, 2020 issued for correspnding U.S. Appl. No. 16/039,901.
Final Office Action dated Jul. 7, 2020 issued for correspnding U.S. Appl. No. 16/039,909.
Non-Final Office Action dated Jul. 6, 2020 issued for corresponding U.S. Appl. No. 16/039,901.

* cited by examiner

# COATING TO IMPROVE OXIDATION AND CORROSION RESISTANCE OF ABRASIVE TIP SYSTEM

BACKGROUND

The present disclosure is directed to a coating layer configuration that will provide oxidation resistance to fan and low pressure compressor blade tips and blade tip abrasives. A thin film coating is applied at the blade tip over a matrix material with abrasive particles forming an abrasive coating.

Gas turbine engines and other turbomachines have rows of rotating blades and static vanes or knife-edge seals within a generally cylindrical case. To maximize engine efficiency, the leakage of the gas or other working fluid around the blade tips should be minimized. This may be achieved by designing sealing systems in which the tips rub against an abradable seal. Generally, the tip is made to be harder and more abrasive than the seal; thus, the tips will abrade or cut into the abradable seal during those portions of the engine operating cycle when they come into contact with each other.

During the operation of a gas turbine engine, it is desired to maintain minimum clearance between the tips and corresponding abradable seals as large gap results in decreased efficiency of the turbine, due to the escape of high-energy gases. However, a small gap may increase the frequency of interaction between the tips and seal. That in turn, due to the friction between the tips and seals, will lead to excessive component wear and efficiency reduction or even component distress. Since aircraft turbines experience cyclic mechanical and thermal load variations during operation their geometry varies during the different stages of the operating cycle. Passive and active clearance control and abrasive tips paired with abradables are currently used to establish and maintain optimum clearance during operation. Ideally, those tips should retain their cutting capability over many operating cycles compensating for any progressive changes in turbine geometry.

The metal matrix and/or abrasive grit in a compressor blade tip abrasive coating are prone to oxidation and/or corrosion due to normal engine operation and adverse environmental conditions. This oxidation/corrosion can lead to decreased cutting performance of the abrasive tip system against an abradable coating leading to blade damage and decrease engine performance over time. What is needed is a coating which can be applied over the blade tip abrasive coating to improve the oxidation/corrosion resistance of the abrasive coating system.

SUMMARY

In accordance with the present disclosure, there is provided an abrasive coating for a substrate of a component in a gas path exposed to a maximum temperature of 500 degrees Fahrenheit, comprising a plurality of grit particles adapted to be placed on a top surface of the substrate; a matrix material bonded to the top surface; the matrix material partially surrounds the grit particles, wherein the grit particles extend above the matrix material relative to the top surface; and a film of oxidant resistant coating applied over the plurality of grit particles and the matrix material.

In another and alternative embodiment, the grit particles extend above the matrix material relative to the top surface.

In another and alternative embodiment, the grit particles are flush with the matrix material relative to the top surface.

In another and alternative embodiment, the grit particles comprise a hard ceramic phase.

In another and alternative embodiment, the matrix material comprises a matrix formed from at least one of Ni, Co and MCrAlY, wherein M is Ni or Co, pure Ni and a cobalt chrome carbide material.

In another and alternative embodiment, the film of oxidant resistant coating comprises an oxide coating.

In another and alternative embodiment, the film of oxidant resistant coating is selected from the group consisting of an aluminum oxide, a nitride coating, a titanium aluminum nitride, a zirconium oxide, a mixture of aluminum and zirconium oxide, zirconium toughened aluminum oxide.

In another and alternative embodiment, an adhesion layer is coupled to the top surface, wherein the adhesion layer is configured to adhere the grit particles to the top surface.

In accordance with the present disclosure, there is provided a turbine engine component configured for a gas path of at most 500 degrees Fahrenheit comprising an airfoil having a tip; a composite abrasive coating bonded to the tip; the composite abrasive coating comprising an adhesion layer bonded to the tip; a layer of grit particles bonded to the adhesion layer; a matrix material coupled to the adhesion layer and connected to the grit particles; and a film of oxidant resistant coating applied over the plurality of grit particles and the matrix material.

In another and alternative embodiment, the first grit particles extend above the matrix material relative to the tip and/or are flush with the matrix material relative to the tip and combinations thereof.

In another and alternative embodiment, the airfoil is a portion of the component configured for a gas path of at most 500 degrees Fahrenheit.

In another and alternative embodiment, the film of oxidant resistant coating is selected from the group consisting of an aluminum oxide, a nitride coating, a titanium aluminum nitride, a zirconium oxide, a mixture of aluminum and zirconium oxide, zirconium toughened aluminum oxide.

In another and alternative embodiment, the film of oxidant resistant coating has a thickness from 0.0002 inch-0.002 inch.

In another and alternative embodiment, the film of oxidant resistant coating is configured to protect the matrix material from oxidation.

In another and alternative embodiment, the component is at least one of a fan and a low pressure compressor.

In accordance with the present disclosure, there is provided a process for coating a turbine engine airfoil with an abrasive, the process comprising applying an adhesion layer onto a tip of the airfoil, wherein the airfoil is configured to operate in a gas path having a maximum temperature of 500 degrees Fahrenheit; adhering a plurality of grit particles to the adhesion layer, wherein spaces are formed between the grit particles; applying a matrix material to the adhesion layer and connecting to the grit particles; applying a film of oxidant resistant coating over the plurality of grit particles and the matrix material.

In another and alternative embodiment, the film of oxidant resistant coating has a thickness from 0.0002 inch-0.002 inch.

In another and alternative embodiment, the film of oxidant resistant coating is selected from the group consisting of an aluminum oxide, a nitride coating, a titanium aluminum nitride, a zirconium oxide, a mixture of aluminum and zirconium oxide, zirconium toughened aluminum oxide.

In another and alternative embodiment, the first grit particles extend above the matrix material relative to the tip and/or are flush with the matrix material relative to the tip and/or are below the matrix material relative to the tip and combinations thereof.

In another and alternative embodiment, the turbine engine airfoil is part of a component in at least one of a fan and a low pressure compressor.

Other details of the coating system are set forth in the following detailed description and the accompanying drawings wherein like reference numerals depict like elements.

DETAILED DESCRIPTION

Figure 1:
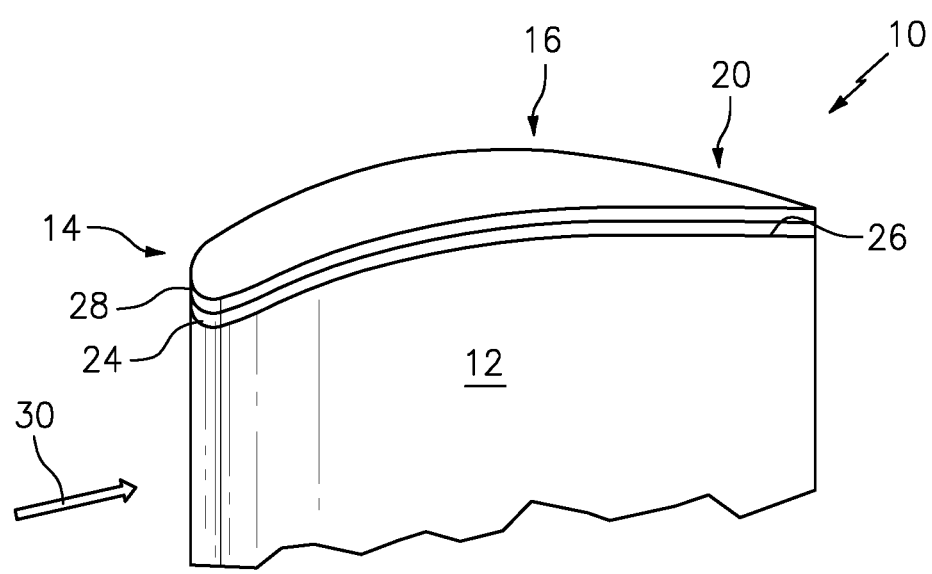
FIG. 1 is a schematic representation of abrasive composite coating applied to a tip of a turbine engine component according to the disclosure.

Referring now to FIG. 1 there is illustrated a turbine engine component 10, such as a gas turbine blade including but not limiting to low pressure compressor airfoils and fan airfoils. The turbine blade 10 has an airfoil portion 12 with a tip 14. The tip 14 has an abrasive coating 16 applied to it. The abrasive coating 16 comprises a corrosion resistant composite material. The abrasive coating includes an abrasive particulate/grit or first grit, simply grit 18, such as cubic boron nitride (CBN), coated silicon carbide (SiC), or another hard ceramic phase.

The grit 18 can be sized as a coarse grit. In an exemplary embodiment the grit 18 can be sized from about 40 to about 1000 microns. The first grit 18 is embedded in a layer matrix composite or simply matrix layer 20. The matrix layer 20 comprises a suitable oxidation-resistant alloy matrix. In an exemplary embodiment the first grit 18 can extend above the matrix material 20 relative to the tip 14 or the first grit particles can be flush with the matrix material relative to said tip or the first grit particles can be below the first grit particles relative to the tip; and combinations thereof.

In an exemplary embodiment the matrix layer 20 comprises a matrix formed from Ni, Co, or MCrAlY, the M standing for either Ni or Co or both. In an exemplary embodiment, the matrix layer 20 can comprise pure nickel, nickel alloy, copper, copper alloy, cobalt, cobalt alloy, chrome, a cobalt chrome carbide material or other alloys.

A second grit 22 can be interspersed between the first grit 18. The second grit 22 is a smaller sized particle than the larger first grit material 18. Second grit 22 are placed within the matrix layer 20 in one or more layers. The resulting blade tip 14 with abrasive coating 16 is particularly well suited for rubbing metal as well as ceramic abradable seals (not shown).

Figure 2:
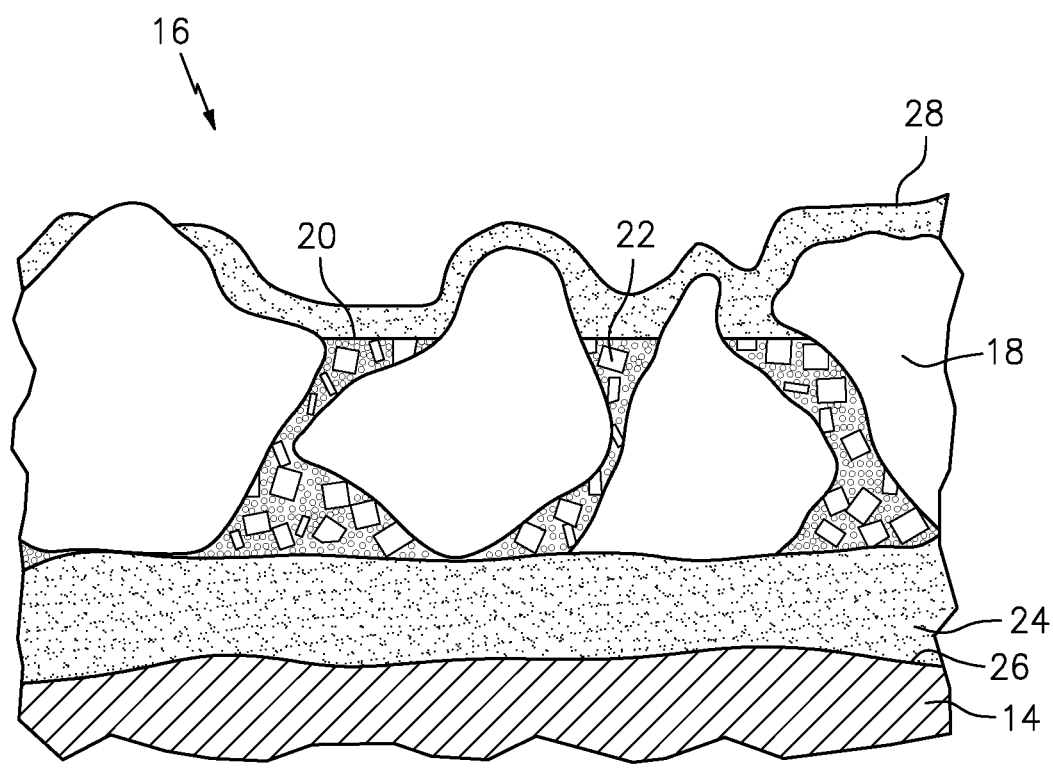
FIG. 2 is a schematic cross-sectional view of the exemplary abrasive blade tip coating.

Referring to FIG. 2 an exemplary abrasive coating 16 is shown. The abrasive coating 16 includes the large first grit 18. In an alternative embodiment, the coating 16 can also include relatively smaller second grit 22 interspersed throughout the matrix layer 20.

The abrasive coating 16 can include an adhesion layer or simply a base layer 24 bonded to a top surface 26 of the blade tip 14. The adhesion layer 24 is configured to adhere the grit particles to the top surface 26. The adhesion layer 24 can be the same material as the matrix layer 20. The adhesion layer 24 can be from about 1 to about 100 microns in thickness. In an exemplary embodiment, the adhesion layer 24 can be from about 25 to about 50 microns in thickness. The adhesion layer 24 can be optionally applied, so that the matrix layer 20 is bonded to the top surface 26 of the tip 14.

In an exemplary embodiment the first grit particles 18 extend above the matrix material 20 relative to the top surface 26. In an exemplary embodiment the first grit particles 18 are flush with the matrix material 20 relative to the top surface 26.

A film of oxidant resistant coating 28 can be applied over the grit particles 18, 22 and the matrix material 20. The film of oxidant resistant coating 28 can comprise an oxide coating. In an exemplary embodiment, the film of oxidant resistant coating 28 can be selected from the group consisting of an aluminum oxide, a nitride coating and a titanium aluminum nitride, a zirconium oxide, a mixture of aluminum and zirconium oxide, zirconium toughened aluminum oxide, and the like. The film of oxidant resistant coating 28 has a thickness from 0.0002 inch-0.002 inch. The film of oxidant resistant coating 28 is configured to protect said matrix material from oxidation/corrosion by acting as a barrier for oxygen diffusion to the matrix layer 20 and/or grit 18, 22 of the abrasive coating 16. The film of oxidant resistant coating 28 can also prevent corrosive species from coming into contact with the abrasive coating 16.

The film of oxidant resistant coating 28 can be applied using a cathodic-arc physical vapor deposition (PVD) or variations thereof.

The component 10 can include a component in a gas path 30 exposed to a maximum temperature of 500 degrees Fahrenheit. In an exemplary embodiment the component can be a fan and/or a low pressure compressor, and the like.

The addition of the film of oxidant resistant coating to the abrasive coating provides the advantage of retaining cutting ability for the abrasive tip system against an abradable air seal. Thus, maintaining the optimum clearance between the blade and the air seal. The improved capacity to resist oxidation/corrosion for the blade tip abrasive coating will provide the advantage of improved durability of the blade tips that may currently merely provide marginal durability.

There has been provided a coating system. While the coating system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. An abrasive coating for a substrate of a component in a gas path exposed to a maximum temperature of 500 degrees Fahrenheit, comprising:
   a plurality of grit particles adapted to be placed on a top surface of said substrate;
   a matrix material bonded to said top surface; said matrix material partially surrounds said grit particles, wherein said grit particles extend above said matrix material relative to said top surface; and
   a film of oxidant resistant coating applied over said plurality of grit particles and said matrix material, wherein said film of oxidant resistant coating consists of a mixture of aluminum and zirconium oxide, and zirconium toughened aluminum oxide.

2. The abrasive coating for a substrate of a component in a gas path exposed to a maximum temperature of 500 degrees Fahrenheit according to claim 1, wherein said grit particles comprise a hard ceramic phase.

3. The abrasive coating for a substrate of a component in a gas path exposed to a maximum temperature of 500 degrees Fahrenheit according to claim 1, wherein said matrix material comprises a matrix formed from at least one of Ni, Co and MCrAlY, wherein M is Ni or Co, pure Ni and a cobalt chrome carbide material.

4. The abrasive coating for a substrate of a component in a gas path exposed to a maximum temperature of 500 degrees Fahrenheit according to claim 1, wherein said film of oxidant resistant coating comprises an oxide coating.

5. The abrasive coating for a substrate of a component in a gas path exposed to a maximum temperature of 500 degrees Fahrenheit according to claim 1, further comprising:
an adhesion layer coupled to said top surface, wherein said adhesion layer is configured to adhere said grit particles to said top surface.

6. A turbine engine component configured for a gas path of at most 500 degrees Fahrenheit comprising:
an airfoil having a tip;
a composite abrasive coating bonded to said tip;
said composite abrasive coating comprising an adhesion layer bonded to said tip;
a layer of grit particles bonded to said adhesion layer;
a matrix material coupled to said adhesion layer and connected to said grit particles; and
a film of oxidant resistant coating applied over said plurality of grit particles and said matrix material, wherein said film of oxidant resistant coating consists of a mixture of aluminum and zirconium oxide, and zirconium toughened aluminum oxide.

7. The turbine engine component configured for a gas path of at most 500 degrees Fahrenheit according to claim 6, wherein said first grit particles extend above said matrix material relative to said tip or said first grit particles are flush with said matrix material relative to said tip and combinations thereof.

8. The turbine engine component configured for a gas path of at most 500 degrees Fahrenheit according to claim 6, wherein said airfoil is a portion of said component configured for a gas path of at most 500 degrees Fahrenheit.

9. The turbine engine component configured for a gas path of at most 500 degrees Fahrenheit according to claim 6, wherein said film of oxidant resistant coating has a thickness from 0.0002 inch-0.002 inch.

10. The turbine engine component configured for a gas path of at most 500 degrees Fahrenheit according to claim 6, wherein said film of oxidant resistant coating is configured to protect said matrix material from oxidation.

11. The turbine engine component configured for a gas path of at most 500 degrees Fahrenheit according to claim 6, wherein said component is at least one of a fan and a low pressure compressor.

12. A process for coating a turbine engine airfoil with an abrasive, said process comprising:
applying an adhesion layer onto a tip of said airfoil, wherein said airfoil is configured to operate in a gas path having a maximum temperature of 500 degrees Fahrenheit;
adhering a plurality of grit particles to said adhesion layer, wherein spaces are formed between said grit particles;
applying a matrix material to said adhesion layer and connecting to said grit particles;
applying a film of oxidant resistant coating over said plurality of grit particles and said matrix material, wherein said film of oxidant resistant coating consists of a mixture of aluminum and zirconium oxide, and zirconium toughened aluminum oxide.

13. The process of claim 12, wherein said film of oxidant resistant coating has a thickness from 0.0002 inch-0.002 inch.

14. The process of claim 12, wherein said first grit particles extend above said matrix material relative to said tip; or wherein said first grit particles are flush with said matrix material relative to said tip; or wherein said first grit particles are below said first grit particles relative to said tip; and combinations thereof.

15. The process of claim 14, wherein said turbine engine airfoil is part of a component in at least one of a fan and a low pressure compressor.

16. The process of claim 14, wherein said turbine engine airfoil comprises an aluminum or polymer composite material.

* * * * *